United States Patent [19]

Kago et al.

[11] 4,339,713
[45] Jul. 13, 1982

[54] APPARATUS FOR DETECTING ROTATIONS

[75] Inventors: Yoshiyuki Kago, Okazaki; Sigeyuki Akita, Aichi; Masao Kotera, Okazaki, all of Japan

[73] Assignee: Nippon Soken, Inc., Nishio, Japan

[21] Appl. No.: 149,245

[22] Filed: May 12, 1980

[30] Foreign Application Priority Data

May 25, 1979 [JP] Japan ................................ 54/65320

[51] Int. Cl.³ ........................... G01P 3/48; G01P 3/54
[52] U.S. Cl. ................................................. 324/173
[58] Field of Search ............... 324/173, 174, 166, 167, 324/208

[56] References Cited

U.S. PATENT DOCUMENTS

| 3,471,844 | 10/1969 | Schugt | 324/173 X |
| 3,597,687 | 8/1971 | Seipp | 324/173 |
| 3,786,354 | 1/1974 | Lasky | 324/173 |
| 4,001,687 | 1/1977 | Sorkin et al. | 324/173 |

Primary Examiner—Stanley T. Krawczewicz
Attorney, Agent, or Firm—Cushman, Darby & Cushman

[57] ABSTRACT

An apparatus for detecting displacements of existing movable bodies made of ferromagnetic materials and magnetized by external magnetic fields, comprising a magnetic sensor disposed in the vicinity of the movable body for detecting change in the magnetic field caused by the motion of the body, and a processor for converting the outputs of the magnetic sensor into pulse signals.

3 Claims, 6 Drawing Figures

APPARATUS FOR DETECTING ROTATIONS

BACKGROUND OF THE INVENTION

This invention relates to apparatuses for out of contact detection of rotations of bodies undergoing rotational displacements, in particular apparatuses for detecting the rotational speed of internal combustion engines for vehicles, which apparatuses are suitable particularly for diesel engines.

Conventional apparatuses for such purposes detect the rotation of a gasoline engine by means of ignition signals therefor or by means of a sensor such as an electromagnetic pick-up which senses the motion of the teeth of an engine cranking gear.

However, the former of the above apparatuses can not be applied to diesel engines which do not utilize spark ignitions, while the latter require boring engines themselves for mounting thereof.

It has been well known that one revolution of a magnetic body having a pair of opposite poles (N and S poles) introduced forcibly by an external magnetic field, will generate one cycle of a change in the magnetic field. We have further found after a variety of experiments that a ferromagnetic body free of external magnetization also exhibits, in one cycle of its revolution, one cycle of a change in the magnetic field due to its inherent magnetization.

SUMMARY OF THE INVENTION

An object of the invention is to provide an apparatus which makes it possible to accurately measure without contact the frequency of, for example, an engine regardless of the type of the engine by means of: a magnetic sensor disposed at a distance away from an existing rotational body, e.g. the crank shaft of an engine, which is made of a ferromagnetic material such as malleable cast iron and is supposed to be weakly magnetized due to inherent magnetization; and a processor means for processing output signals from such a detecting apparatus.

BRIEF DESCRIPTION OF THE DRAWINGS

The present invention will be described more specifically with reference to the following figures in which.

DESCRIPTION OF THE PREFERRED EMBODIMENTS

Figure 1:
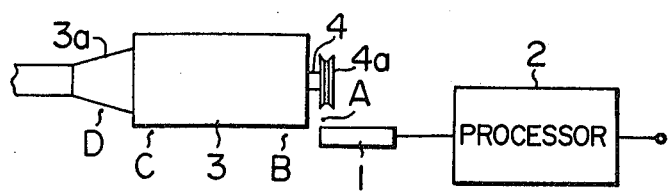
FIG. 1 shows a block diagram of a first embodiment of the invention.
Figure 2:
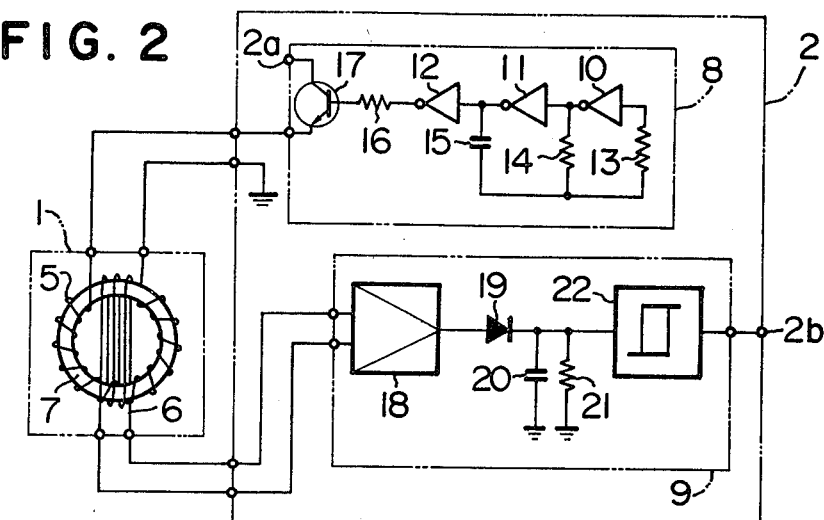
FIG. 2 illustrates an electric circuit used in the first embodiment.

In the first embodiment as shown in FIGS. 1 and 2, a magnetic sensor 1 is placed at a point A near an existing pulley 4a mounted on a crank shaft 4 of an engine 3 to drive, for example, an a.c. voltage generator (not shown). A transmission 3a connects the crank shaft 4 with a vehicle driving shaft. The magnetic sensor 1 comprises a drive coil 5, a detection coil 6, and a flux-gate type magnetometer having a ring permalloy magnetic core 7. As shown in FIG. 2, the coils 5 and 6 are wound around the magnetic core 7. The sensor 1 is so arranged that the axes of the core 7 and the crank shaft 4 are mutually perpendicular and that the axes of the detection coil 6 and the crank shaft 4 are in parallel each other as shown in FIG. 1. The sensor 1 is connected with a processor 2. The processor 2 comprises an energizing circuit 8 to make the magnetic sensor 1 operable and a detection circuit 9 to detect the output of the magnetic sensor 1. A terminal 2a is a power terminal to be connected with a constant voltage circuit, while a terminal 2b is an output terminal. The energizing circuit 8 comprises an astable multivibrator, or an osillator circuit, having inverter gates 10, 11, and 12, resistors 13, 14, and 16, condenser 15, and a transistor 17. The detection circuit 9 comprises an AC amplifier 18, a diode 19, a condenser 20, a resistor 21, and a Schmidt circuit 22.

Now the operation of the above embodiment will be described below. The periodic triangular output (FIG. 3(a)) of the astable multivibrator comprising the inverter gates 10 and 11, the resistors 13 and 14, and the condenser 15 is impressed via the transistor 17 on the drive coil 5 of the magnetic sensor 1. The frequency of the periodic triangular output (5 KHz in this example) must be considerably higher than the maximum rotational frequency (0.1 KHz) of the crank shaft 4. Other forms of the wave e.g. sinusoidal one may alternately be used as the periodic output. This signal will generate an intense driving magnetic field in the core 7, which will be superposed with a weak external magnetic field added to the former as a signal, and results in a signal in the detection coil 6 having the amplitude proportional to the resultant magnetic field intensity (FIG. 3(b)). Thus, the amplitude is constant when the crank shaft 4 is at rest, as shown by the portion of the graph left to the line A in FIG. 3(b), while when the crank shaft is in rotation the signal from the detection coil is amplitude-modulated as shown by the counter portion of the graph to the right of line A in the same figure.

Figure 3:
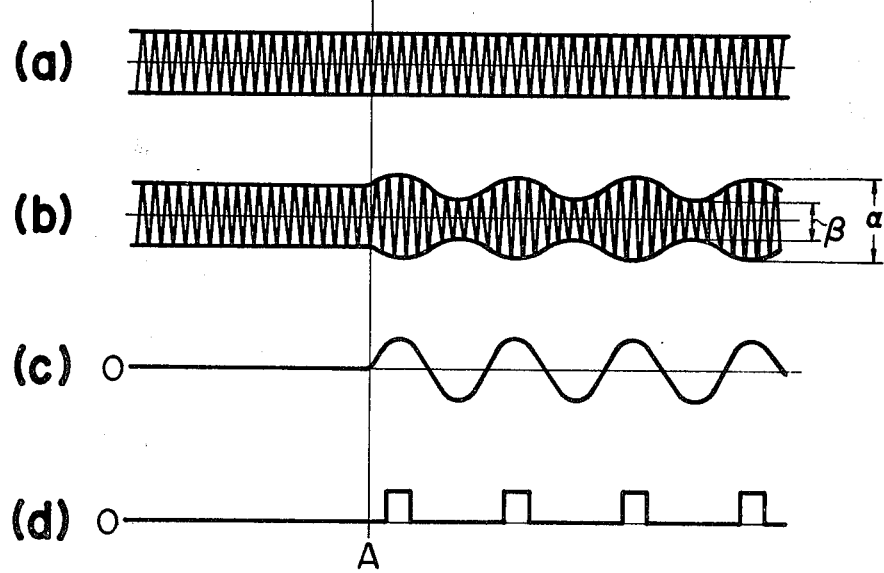
FIG. 3 illustrates the wave-forms appearing in the circuit, provided as an aid for understanding the operation of the first embodiment.

The crank shaft 4 supposedly carries a magnetic field (due to unspecified magnetic sources) which is stronger than that of the earth and can be regarded as a part of a weak magnet having a single pole, thereby generating one period of the amplitude-modulated signal for each revolution of the crank shaft. The output of the detection coil 6 is amplified by the AC amplifier and envelope-detected by a detection circuit consisting of the diode 19, the condenser 20, and the resistor 21, to have a wave-form as shown in FIG. 3(c). This output signal is converted into pulses by a shaping circuit or the Schmidt circuit 22, which provides at the output terminal 2b a signal as shown in FIG. 3(d). The detection circuit 9 may be constructed so that the output of the amplifier 18 is periodically sampled for envelope detection. One pulse of the signal corresponds to one revolution of the crank shaft, so that the rotational frequency of the engine is easily obtained by counting the pulses.

Figure 4:
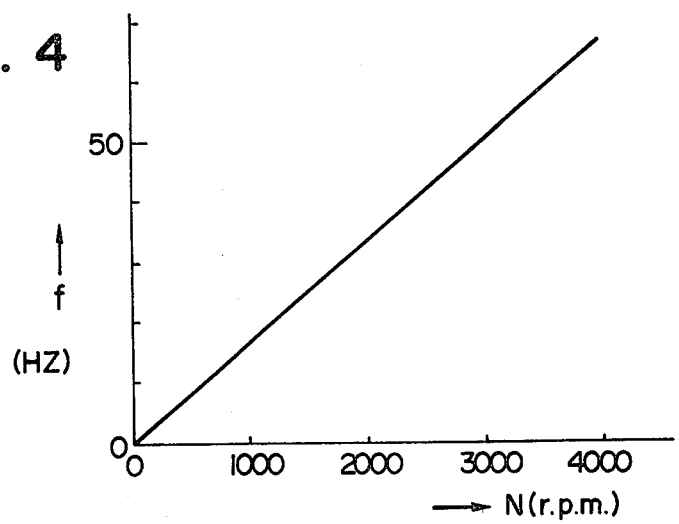
FIG. 4 illustrates a characteristic example of a measurement using the first embodiment.

In the measurement of the rotational frequencies of a diesel engine by means of the above first embodiment the maximum magnetic field was observed near the pulley on the crank shaft, near which the magnetic sensor 1 was positioned. The data of the measurement are shown in FIG. 4, in which the rotational frequency N of the engine is plotted along the abscissa, and the output pulse frequency f along the ordinate. FIG. 4 shows that the rotational frequency of the engine can be accurately measured up to 4,000 rpm.

The following are the results of the measurements performed on an H type and an L type diesel engines manufactured by TOYOTA Motor Company. These two types of engines were each mounted on test benches.

CONDITIONS OF THE MEASUREMENTS

Ambient temperature: 20° C.; Distance between the magnetic sensor 1 and the object subject to the measurements: 10 mm; Number of turns of the drive coil 5: 140 turns (wire diameter 0.16 mm); Number of turns of the detection coil 6: 180 turns (wire diameter 0.12 mm); Locations of the measurements: Point A (beneath the pulley 4a), Point B (beneath the front bottom of the engine 3), Point C (beneath the rear bottom of the engine 3), Point D (beneath the transmission 3a); Measured quantity: Rate of amplitude modulation in the output signal of the magnetic sensor 1 as defined by $(\alpha-\beta)/(\alpha+\beta)\times 100\%$ for the wave form as shown in FIG. 3(b).

| Type of Engine | RESULTS | | | |
| --- | --- | --- | --- | --- |
| | Point A | Point B | Point C | Point D |
| L | 67% | 17% | 4% | 4% |
| H | 17% | 5% | 1% | 1% |

Pulse signals associated with these amplitude modulations were measured at the output terminal 2b, and were proved to have sufficient strength for the detection of the rotational frequencies in all cases with the modulation rates not less than 4%, but have insufficient strength in the cases where the modulation rates were 1%.

Utilizing the directivity of the magnetic sensor 1, the influence of the earth magnetic field on the sensor 1 was examined and, although the modulation rate is affected a little by the field in some ordientatoins of the sensor 1, it has been verified that pulses proportional to a rotational frequency are obtainable when the modulation rate is 4% and over.

When the above described first embodiment is applied to a gasoline engine, the sensor 1 is to be positioned within the range of 1 to 2 mm from the pulley 4a due to the fact that the ignition system may cause noise in the magnetic field thereby misleading to a false operation of the detection apparatus. However, with the pulley 4a forcibly magnetized by an external field, it was possible to position the sensor 1 10 mm away from the pulley 4a to detect easily the rotational frequency of the pulley 4a.

Figure 5:
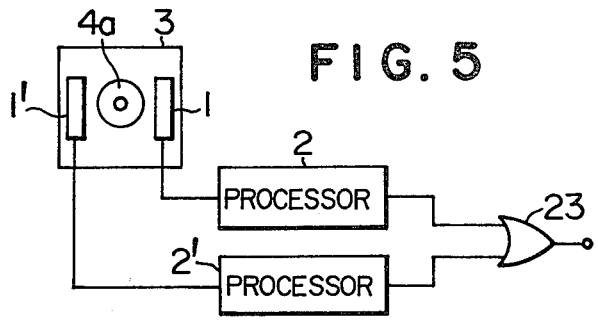
FIG. 5 shows a block diagram of a second embodiment of the invention.
Figure 6:
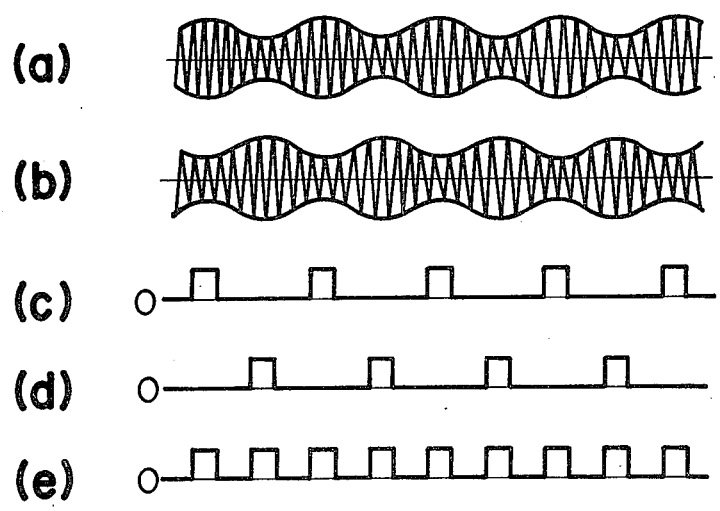
FIG. 6 illustrates the wave-forms at various points in the second embodiment, provided for understanding the second embodiment.

FIG. 5 shows a second embodiment of the invention, wherein a pair of opposed magnetic sensors 1 and 1' are provided angularly displaced through an angle of 180°, near the pulley 4a. As the pulley 4a rotates the magnetic sensors 1 and 1' each acquire amplitude modulated signals, as shown in FIGS. 6(a) and 6(b), respectively, which are out of phase by 180° from each other. These output signals from the magnetic sensors 1 and 1' are amplified, detected, and wave-shaped into pulses in respective processors 2 and 2', to provide out-of-phase pulse signals, as shown in FIGS. 6(c) and 6(d), respectively. Then the OR gate 23 takes a logical summation of these output pulses from the processors 2 and 2' to provide a pulse signal as shown in FIG. 6(e). In short, two pulses can be obtained for every revolution of the pulley 4a, and hence the counting accuracy is increased.

In comparison with a detection apparatus involving ring gear teeth and a sensor such as an electromagnetic pick-up to detect the former, the above described embodiments have the following advantages:

(1) In contrast to a ring gear sensor which must be mounted near a ring gear (2 mm or below) and hence require boring the body of an engine, a sensor according to the present invention requires no such machining.

(2) While a ring gear sensor is to be positioned close to a ring gear (2 mm or below), a sensor of the invention has a much greater degree of freedom in the choice of its mounting position, since the latter can detect the motion of an engine pulley even at a distance 20 to 30 mm away therefrom.

(3) A sensor of this invention is sufficiently sensitive to low-speed rotational motions, to which however, a ring gear sensor is insensitive.

Although the invention is described above in connection with the detection of a rotational frequency of an engine, it should be understood that the invention can be applied not only to such rotational displacements but also to any types of displacements, including reciprocating displacements, of a body so long as the body accompanies a detectable magnetic field.

Since a magnetic sensor of this invention is placed near an existing ferromagnetic movable body, which can be magnetized by an external magnetic field if needed, and since the outputs of this magnetic sensor are converted into pulse signals by a processor, as described above, the invention has advantages that the motion of the movable body can be detected without contact machining thereon, and that the location of the magnetic sensor can be chosen with a greater degree of freedom.

What we claim is:

1. An apparatus for detecting a rotational speed of an internal combustion engine having a rotatable member made of a magnetically permeable material having a residual magnetism which provides a first magnetic flux, said apparatus comprising:

a magnetic core shaped in the form of a ring positioned in the vicinity of said rotatable member;

a drive coil wound circularly on said magnetic core for generating a second magnetic flux when energized, said second magnetic flux passing through said magnetic core;

an energizing circuit connected to said drive coil for energizing said drive coil by periodic signals generated continuously and having both a predetermined amplitude and a predetermined frequency much higher than the maximum rotational frequency attainable for said rotatable member;

a detection coil wound diametrically on said magnetic core for generating output signals in proportion to changes in magnetic flux passing therethrough, said changes being caused by changes in said first and second magnetic fluxes resulting from the periodic energization of said drive coil and the rotation of said rotatable member; and a detection circuit connected to said second coil for converting said output signals into pulse signals having a frequency proportional to the rotational speed of said rotatable member by subjecting said output signals to wave-form detection.

2. An apparatus according to claim 1, wherein said internal combustion engine is of a diesel type provided with a pulley at one end of said rotatable member, and wherein said magnetic core is positioned adjacent to said pulley.

3. An apparatus for detecting a rotational speed of an internal combustion engine having a rotatable member made of a magnetically permeable material having a residual magnetism which provides a first magnetic flux, said apparatus comprising:

- a first magnetic core shaped in the form of a ring positioned in the vicinity of said rotatable member;
- a second magnetic core shaped in the form of a ring positioned in the vicinity of said rotatable member oppositely to said first magnetic core;
- a first drive coil wound circularly on said first magnetic core for generating a second magnetic flux when energized, said second magnetic flux passing through said first magnetic core;
- a second drive coil wound circularly on said second magnetic core for generating a third magnetic flux when energized, said third magnetic flux passing through said second magnetic core;
- a first energizing circuit connected to said first coil for energizing said first drive coil by periodic signals generated continuously and having both a predetermined amplitude and a predetermined frequency much higher than the maximum attainable frequency of said rotatable member;
- a second energizing circuit connected to said second drive coil for energizing said second drive coil by periodic signals generated continuously and having both a predetermined amplitude and a predetermined frequency much higher than the maximum attainable rotational frequency of said rotatable member;
- a first detection coil wound diametrically on said first magnetic core for generating first output signals in proportion to changes in magnetic flux passing therethrough, said changes being caused by changes in said first and second magnetic fluxes resulting from the periodic energization of said first drive coil and the rotation of said rotatable member;
- a second detection coil wound diametrically on said second magnetic core for generating second output signals in proportion to changes in magnetic flux passing therethrough, said changes being caused by changes in said first and third magnetic fluxes resulting from the periodic energization of said second drive coil and the rotation of said rotatable member and said first and second output signals being out of phase by 180°;
- a first detection circuit connected to said first detection coil for converting said first output signals into first pulse signals having a frequency proportional to the rotational speed of said rotatable member by subjecting said first output signals to wave-form detection;
- a second detection circuit connected to said second detection coil for converting said second output signals into second pulse signals having a frequency proportional to the rotational speed of said rotatable member by subjecting said second output signals to wave-form detection; and
- an OR circuit connected to said first detection circuit and said second detection circuit for combining said first and second output signals.

* * * * *